(12) United States Patent
Gerdes et al.

(10) Patent No.: US 11,515,824 B2
(45) Date of Patent: Nov. 29, 2022

(54) SWITCHED RELUCTANCE SELF SENSING ACTIVE PULSE TORQUE COMPENSATION

(71) Applicant: Caterpillar Inc., Peoria, IL (US)

(72) Inventors: Jesse R. Gerdes, Dunlap, IL (US); Jackson Wai, Dunlap, IL (US); Ahmed Khalil, Dunlap, IL (US); James Michael Thorne, Dunlap, IL (US); Sajan Abdul, Dunlap, IL (US); Amara Ashfaq, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 158 days.

(21) Appl. No.: 17/129,201

(22) Filed: Dec. 21, 2020

(65) Prior Publication Data

US 2022/0200502 A1    Jun. 23, 2022

(51) Int. Cl.
*H02P 6/18* (2016.01)
*H02P 25/098* (2016.01)
*H02P 21/20* (2016.01)
*H02P 25/08* (2016.01)

(52) U.S. Cl.
CPC ............ *H02P 25/098* (2016.02); *H02P 21/20* (2016.02); *H02P 25/0805* (2016.02)

(58) Field of Classification Search
CPC .... H02P 25/098; H02P 21/20; H02P 25/0805; H02P 25/089; H02P 6/185
See application file for complete search history.

(56) References Cited

U.S. PATENT DOCUMENTS

| | | | |
|---|---|---|---|
| 6,326,750 B1 | 12/2001 | Marcinkiewicz | |
| 6,927,548 B2 | 8/2005 | Nishizaki et al. | |
| 7,604,088 B2 | 10/2009 | Nishizaki et al. | |
| 2008/0129243 A1* | 6/2008 | Nashiki | H02K 3/28 318/701 |
| 2014/0035505 A1* | 2/2014 | Wai | H02P 23/03 318/461 |
| 2015/0381087 A1 | 12/2015 | Han | |

FOREIGN PATENT DOCUMENTS

EP    1553691 B1    6/2010

OTHER PUBLICATIONS

Written Opinion and International Search Report for Int'l. Patent Appln. No. PCT/US2021/063175, dated Mar. 16, 2022 (11 pgs).

* cited by examiner

*Primary Examiner* — Muhammad S Islam

(74) *Attorney, Agent, or Firm* — von Briessen & Roper, s.c.

(57) ABSTRACT

A system and method for torque compensation in a switched reluctance (SR) machine disposed on a machine is disclosed. The system may comprise a SR machine, an inverter and a controller. The controller is in operable communication with the inverter and is configured to determine a commanded main current associated with energization by a main current of a first portion of the plurality of windings for a controlling phase, and determine a commanded parasitic current associated with energization by a parasitic current of a second portion of the windings in a non-controlling phase. The controller is further configured to determine an offset current based on the commanded parasitic current, and determine a target current based on a first sum of the commanded main current and the offset current, and command the inverter to actuate the target current in the first portion of the windings during the controlling phase.

20 Claims, 4 Drawing Sheets

SWITCHED RELUCTANCE SELF SENSING ACTIVE PULSE TORQUE COMPENSATION

TECHNICAL FIELD

The present disclosure generally relates to a switched reluctance (SR) machine, and more particularly, to systems for torque compensation.

BACKGROUND

A SR machine is typically an electric machine configured to convert electrical energy into rotational torque or rotational torque into electrical energy for any one of a variety of different applications including power generation, power back-up, off-shore drilling, machine tools, traction motors, industrial work machines, marine work machines, and the like.

The SR machine includes a rotor and a stator. Unlike common brushed DC motor types, power is delivered to windings in the stator (case) rather than the rotor. Accurate determination of the position of the rotor relative to the stator of the SR machine, while at rest or at an otherwise substantially low machine speed, is important to the performance and efficiency of the SR machine. Conventionally, the position information for the rotor of the SR machine has been obtained from use of direct position sensor(s) mounted on the shaft but such hardware adds to cost and complexity of the overall drive system. Methods for obtaining or deriving position information without the use of conventional direct position sensors help reduce minimum package size and cost for SR machines.

Some SR machines may have a control system with sensor-less operation which estimate the position and speed of the rotor relative to the stator without the use of a conventional direct position sensor. Such controls systems may estimate rotor position by injecting a current pulse into one or more idle phases of the stator of the SR machine. A stator current flowing through the idle phases may be then estimated using an observer-based estimation approach. The estimated stator current may then be compared with an actual stator current to generate an error signal. The error signal may be used to compute an estimated position of the rotor and an estimated speed of the rotor. However, when the rotor is at a substantially low machine speed or at rest, accurate determination of the position of the rotor relative to the stator may be very difficult as the error signal produced may be quite weak. Furthermore, the stator current flowing through the idle phase(s) may produce an undesired retarding torque when the SR machine is operating in a motoring quadrant.

U.S. Pat. No. 7,604,088 discloses an electric power steering system for providing a favorable steering feeling without using compensation logics such as of inertia compensation and friction compensation. The electric power steering system includes road-noise suppression control means for controlling a steering assist motor in a manner to damp torque transmission in a higher frequency region representing road noises than a frequency region representing road information. A friction value of a steering mechanism is decreased enough to allow the intrinsic vibrations of the steering mechanism to appear. Rotor inertia of the steering assist motor is set to a value small enough to allow the frequencies of the intrinsic vibrations to be present in the frequency region where the torque transmission is damped by the road-noise suppression control means. While beneficial, a better system is needed.

SUMMARY OF THE DISCLOSURE

In one aspect of the present disclosure, a system for torque compensation in a switched reluctance (SR) machine disposed on a machine is disclosed. The system comprises a SR machine, an inverter and a controller. The SR machine includes a stator and a rotor rotatably disposed within the stator. The stator includes a plurality of windings. The SR machine is configured to rotate the rotor when one or more of the windings are energized. The inverter is operably connected to the plurality of windings. The inverter may be configured to generate a target current in a first portion of the plurality of windings. The controller is in operable communication with the inverter and is configured to: determine a commanded main current associated with energization by a main current of the first portion of the plurality of windings for a controlling phase; determine a commanded parasitic current associated with energization by a parasitic current of a second portion of the windings in a non-controlling phase; determine an offset current based on the commanded parasitic current; determine a target current based on a first sum of the commanded main current and the offset current; and command the inverter to actuate the target current in the first portion of the windings during the controlling phase.

In another aspect of the disclosure, a method for torque compensation in a in a SR machine is disclosed. The SR machine includes a stator and a rotor rotatably disposed within the stator. The stator includes a plurality of windings. The SR machine is configured to rotate the rotor when one or more of the windings are energized. The method comprises: determining, by a controller, a commanded main current associated with energization by a main current of a first portion of the plurality of windings for a controlling phase; determining, by the controller, a commanded parasitic current associated with energization by a parasitic current of a second portion of the windings in a non-controlling phase; determining an offset current based on the commanded parasitic current; determining a target current based on a first sum of the commanded main current and the offset current; and actuating the target current in the first portion of the windings during the controlling phase.

In yet another aspect of the disclosure, a computer program product is disclosed. The computer program product comprises a computer usable medium having a computer readable program code embodied therein. The computer readable program code is adapted to be executed to implement a method for torque compensation in a SR machine that includes a stator and a rotor rotatably disposed within the stator, the stator including a plurality of windings, the SR machine configured to rotate the rotor when one or more of the windings are energized, the method comprising: determining, by a controller, a commanded main current associated with energization by a main current of a first portion of the plurality of windings for a controlling phase; determining, by the controller, a commanded parasitic current associated with energization by a parasitic current of a second portion of the windings in a non-controlling phase; determining an offset current based on the commanded parasitic current; determining a target current based on a first sum of the commanded main current and the offset current; and actuating the target current in the first portion of the windings during the controlling phase.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts, unless otherwise specified.

Figure 1:
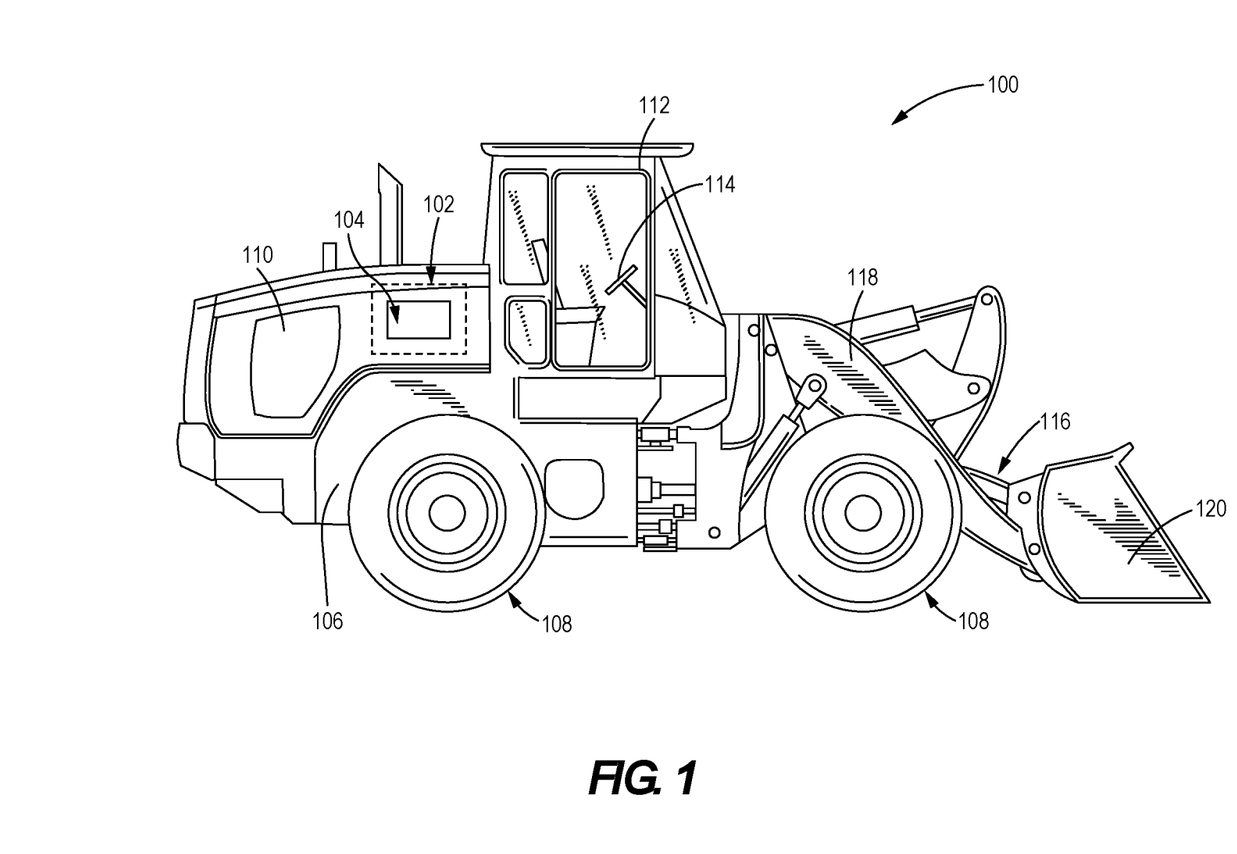
FIG. 1 is a diagram of an exemplary machine that includes an SR machine.

FIG. 1 is a diagram of an exemplary machine 100, a wheel loader, that incorporates features of the present disclosure, namely an electric drive system 102 that includes a SR machine 104, e.g., a SR motor or a SR generator. For discussion purposes the exemplary embodiment illustrates the SR machine 104 utilized as a SR motor, however, in other embodiments, the SR machine 104 may be utilized as a generator (operably coupled to the power source 110 (e.g., engine). As shown, the machine 100 includes a frame 106, a traction system 108 supporting the frame 106, a power source 110 mounted to the frame 106, and an electric drive system 102 configured to transfer energy from the power source 110 to the traction system 108. The machine 100 may also include an operator cab 112. The power source 110 is configured to supply power to the machine 100 and provide operating power to the electric drive system 102. In some implementations, the power source 110 may be a direct current (DC) power source. The power source 110 may be in operable communication with operator controls 114 in the operator cab 112 and may be configured to receive control signals from the operator controls 114. Additionally, the power source 110 may be operably coupled to other systems of the machine 100.

The electric drive system 102 may be operably coupled to the power source 110 to selectively propel the machine 100 via control signals from the operator controls 114. The electric drive system 102 may be operably connected to the traction system 108, as shown, which may be operably connected to the machine 100 through axles, drive shafts, a transmission, and/or other components. In some implementations, the traction system 108 may be provided in the form of a wheel-drive system, a track-drive system, or any other type of drive system configured to engage the ground and propel the machine 100.

In some implementations, the electric drive system 102 may additionally, or alternatively, be operably coupled to the power source 110 to selectively operate an implement 116, which may be movably mounted on the frame 106 and operably connected to the electric drive system 102. The illustrated implement 116 includes a lift arm assembly 118 and a bucket 120. Other embodiments may include any other suitable implement for a variety of tasks, such as, for example, dozing, blading, brushing, compacting, grading, lifting, rip-ping, plowing, or the like.

As indicated above, FIG. 1 is provided as an example of a machine 100 that may utilize the electric drive system 102 of the present disclosure. Other examples are possible and may differ from what was described in connection with FIG. 1.

Figure 2:
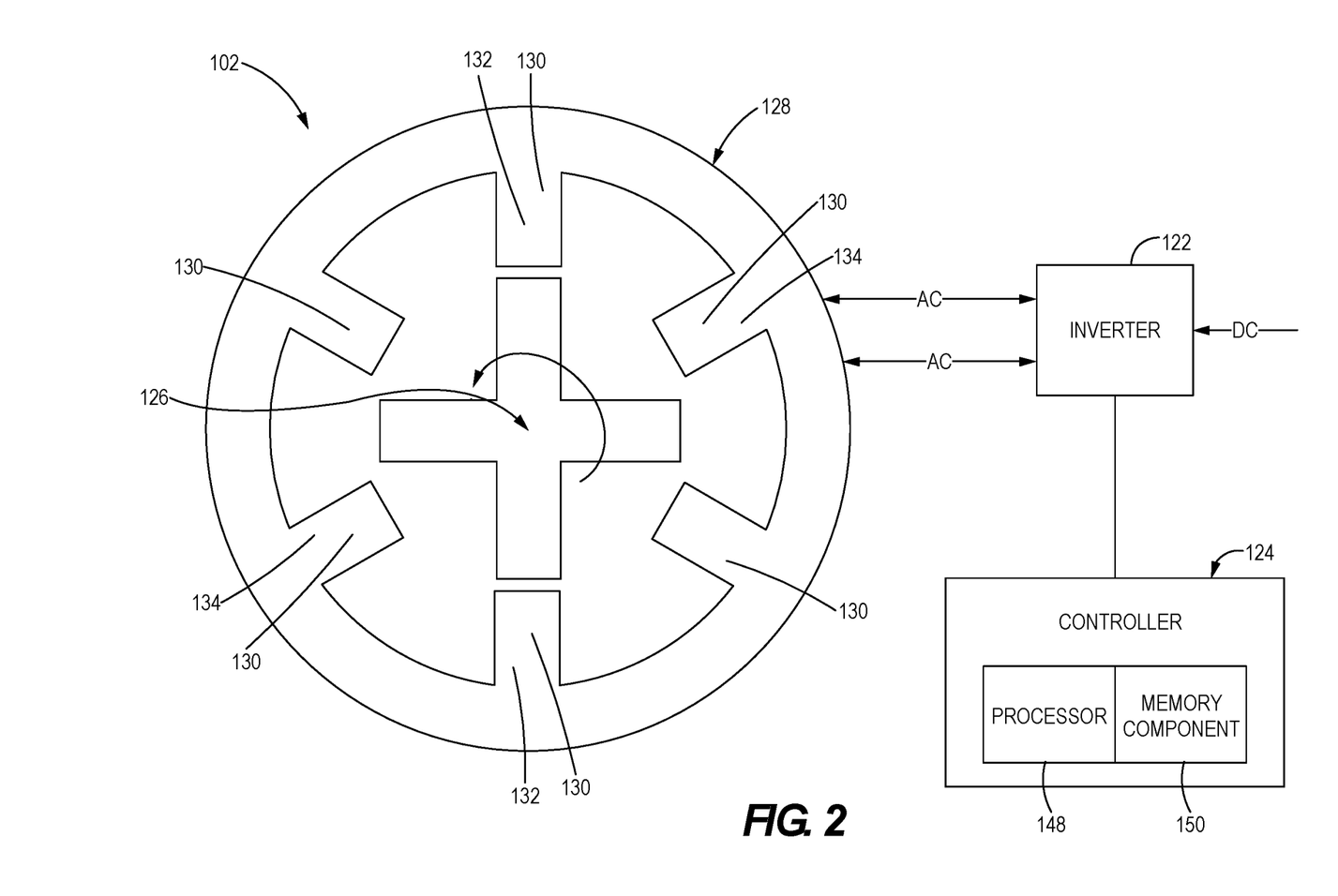
FIG. 2 is a schematic illustration of an exemplary embodiment of an electric drive system, according to the present disclosure.

As shown in FIG. 2, the electric drive system 102 comprises a switched reluctance (SR) machine 104, an inverter 122, and a controller 124. The SR machine 104 includes a rotor 126 that is rotatably disposed within a (fixed) stator 128. In the exemplary embodiment, the SR machine 104 may be configured to operate as a SR motor. The rotor 126 of the SR machine 104 may be coupled to an output shaft (not shown) which may be, in turn, connected to drive a mechanical load (not shown). Each (phase) winding 130 of the stator 128 of the SR machine 104 may be electrically coupled to the inverter 122. The SR machine 104 may be configured to rotate the rotor 126 in response to current (e.g., target current 136, main current 138) provided to the stator 128 from the inverter 122. The windings 130 that are energized by a target current 136 (see FIG. 5) or a main current 138 to rotate the rotor 126 (FIG. 2) in a commanded direction per a machine command are referred to as being in a controlling phase 132. The remaining windings 130 that are not energized or are energized with parasitic current 140 (FIG. 4) for diagnostic/positional purposes, and the like, are referred to as being in an idle or non-controlling phase 134 (FIG. 2).

The inverter 122 may be electrically connected to the power source 110 (FIG. 1). In some embodiments, the inverter 122 (FIG. 2) may receive a DC current and provide an AC current to the stator 128 of the SR machine 104. More specifically, the inverter 122 is in operable communication with the controller 124 and is configured to provide (AC) current to selected windings 130 of the stator 128 of the SR machine 104 in response to control signals/commands received from the controller 124. The current provided may be a target current 136 (FIG. 5), a main current 138 (see FIG. 5), a parasitic current 140 (FIG. 4), or other current.

Figure 5:
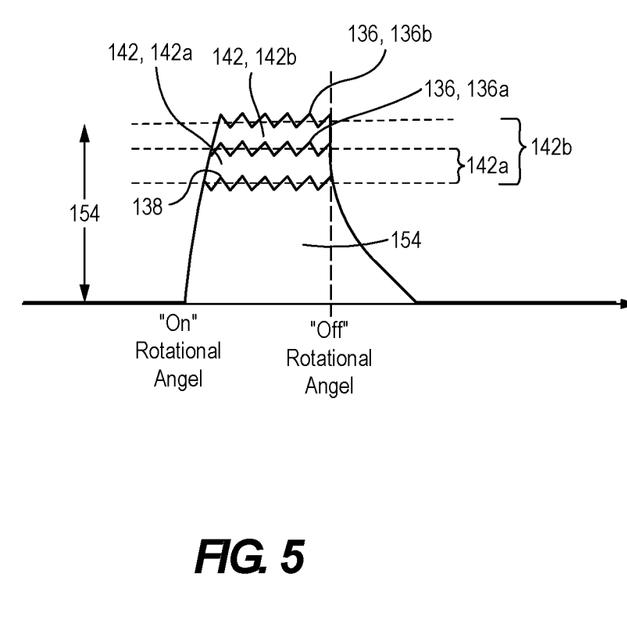
FIG. 5 is a diagrammatic view comparing two exemplary target currents.

The controller 124 (FIG. 2) is configured to control the operation of the inverter 122. The controller 124 may be configured to transmit control signals to the inverter 122 to selectively energize one or more windings 130 of the SR machine 104 with current. As discussed above, when energized to drive a desired rotation of the rotor 126, the windings 130 are considered to be in a controlling phase 132 and the current supplied by the inverter 122 may be referred to as a target current 136 (FIG. 5), as described later herein, or in the absence of an offset current 142 (discussed later herein), the current supplied by the inverter 122 (FIG. 2) in a controlling phase 132 may be referred to as the main current 138 (FIG. 5).

Figure 4:
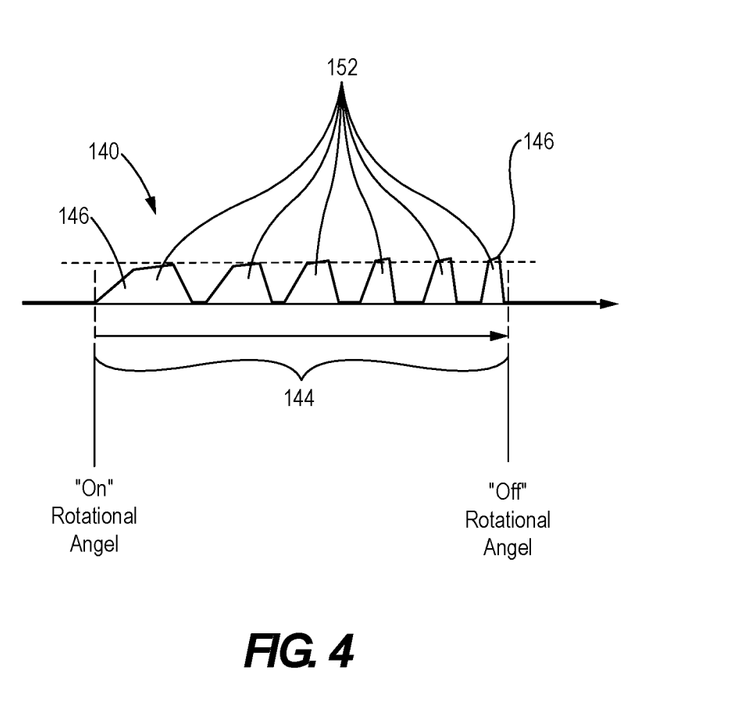
FIG. 4 shows a diagrammatic illustration of exemplary parasitic pulses injected in a parasitic injection window.

The controller 124 (FIG. 2) may be further configured to transmit commands to the inverter 122 to inject parasitic current 140 (FIG. 4) (such commands, commanded parasitic current) to at least one idle or non-controlling phase 134 (FIG. 2) of the stator 128 of the SR machine 104 when the SR machine 104 is operating at zero revolutions per minute (rpm), approximately at zero rpm, or at an otherwise relatively low speed. The parasitic current 140 (FIG. 4) may be supplied in an injection window ("parasitic injection window" 144) timeframe by the inverter 122 (FIG. 2) in the form of current pulses ("parasitic pulse(s)" 146). The start of the parasitic injection window is defined by an "on" rotational angle and the end of the parasitic injection window is defined by an "off" rotational angle, each of the "on"

rotational angle and the "off" rotational angle is measured compared to rotor 126 position θ. As used herein, θ means a reference electrical cycle rotor position. FIG. 4 shows a diagrammatic illustration of exemplary parasitic pulses 146 injected in a parasitic injection window 144 by the inverter 122 to at least one idle or non-controlling phase 134 of the stator 128.

The controller 124 (FIG. 2) may include a processor 148 and a memory component 150. The controller 124 is in operable communication with the SR machine 104 and the inverter 122. The controller 124 is configured to determine a commanded main current associated with energization by a main current 138 of a first portion of the plurality of windings 130 for a controlling phase 132. The controller 124 is further configured to determine a commanded parasitic current associated with energization by a parasitic current 140 of a second portion of the plurality of windings 130 in a non-controlling phase 134. The controller 124 is further configured to determine an offset current 142 based on the commanded parasitic current, and to determine a target current 136 based on the sum of the commanded main current and the offset current 142. The controller 124 is further configured to command the inverter 122 to actuate the target current 136 in the first portion of the windings 130 during the controlling phase 132.

The processor 148 may be a microcontroller, a digital signal processor (DSP), an electronic control module (ECM), an electronic control unit (ECU), a field-programmable gate array (FPGA), a microprocessor or any other suitable processor 148 as known in the art. The processor 148 may execute instructions and generate control signals for determining a commanded main current, a commanded parasitic current, an offset current 142 and a target current 136, and for actuating the inverter 122. Such instructions may be read into or incorporated into a computer readable medium, such as the memory component 150 or provided external to the processor 148. In alternative embodiments, hard wired circuitry may be used in place of, or in combination with, software instructions to implement a control method.

The term "computer readable medium" as used herein refers to any non-transitory medium or combination of media that participates in providing instructions to the processor 148 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other computer readable medium.

The controller 124 is not limited to one processor 148 and memory component 150. The controller 124 may include several processors 148 and memory components 150. In an embodiment, the processors 148 may be parallel processors that have access to a shared memory component(s) 150. In another embodiment, the processors 148 may be part of a distributed computing system in which a processor 148 (and its associated memory component 150) may be located remotely from one or more other processor(s) 148 (and associated memory components 150) or FPGA(s) that are part of the distributed computing system.

The controller 124 may also be configured to retrieve from the memory component 150 and formulas and other data necessary for the calculations discussed herein.

Also disclosed is a method of torque compensation in a SR machine 104. The method may comprise: determining, by a controller 124, a commanded main current associated with energization by a main current 138 of a first portion of the plurality of windings 130 for a controlling phase 132; determining, by the controller 124, a commanded parasitic current associated with energization by a parasitic current 140 of a second portion of the windings 130 in a non-controlling phase 134; determining an offset current 142 based on the commanded parasitic current; determining a target current 136 based on a sum of the commanded main current and the offset current 142; and actuating the target current 136 in the first portion of the windings 130 during the controlling phase 132.

Also disclosed is a computer program product comprising a computer usable medium having a computer readable program code embodied therein, the computer readable program code adapted to be executed to implement a method for torque compensation in the switched reluctance SR machine 104, the method comprising: determining, by a controller 124, a commanded main current associated with energization by a main current 138 of a first portion of the plurality of windings 130 for a controlling phase 132; determining, by the controller 124, a commanded parasitic current associated with energization by a parasitic current 140 of a second portion of the windings 130 in a non-controlling phase 134; determining an offset current 142 based on the commanded parasitic current; determining a target current 136 based on a sum of the commanded main current and the offset current 142; and actuating the target current 136 in the first portion of the windings 130 during the controlling phase 132.

INDUSTRIAL APPLICABILITY

Figure 3:
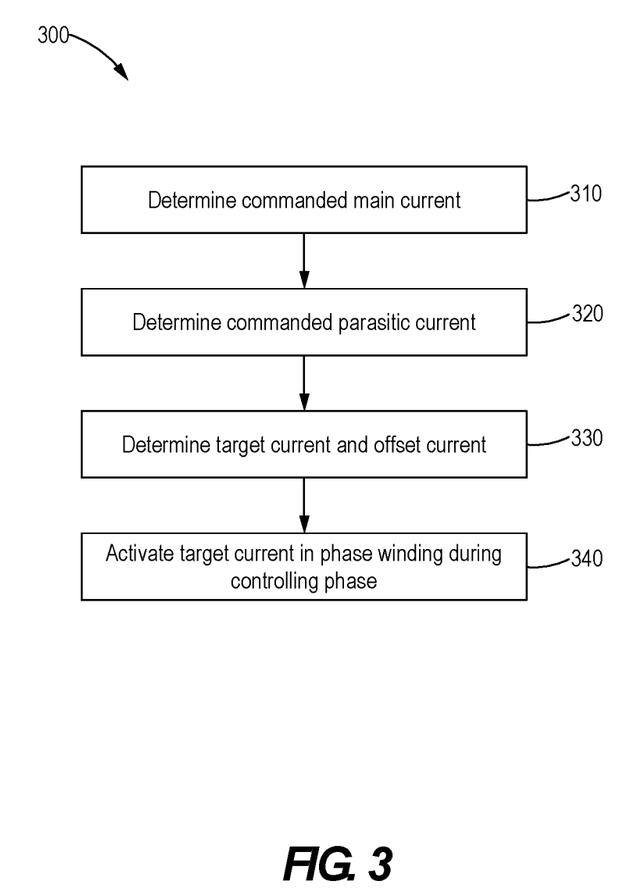
FIG. 3 is a flow diagram of one exemplary method of torque compensation, according to the present disclosure.

In operation, the controller 124 may be configured to operate according to a predetermined method 300, as shown for example in FIG. 3. FIG. 3 is an exemplary flowchart describing a method 300 for torque compensation.

In block 310, the controller 124 determines a commanded main current associated with energization by a main current 138 (see FIG. 5) of a first portion of the plurality of windings 130 for a controlling phase 132 of the SR machine 104. The commanded main current is associated with the generation of AC current to be provided by the inverter 122 to energize one or more windings 130 of the stator 128 to produce rotational pull of the rotor 126 at a selected speed or torque. Such current may be referred to as the main current 138. The windings 130 that are energized are considered to be in a controlling phase 132 during the duration of the main current 138. In some embodiments in certain speed and torque regions, which may vary depending on the SR machine 104, the main current 138 may have a generally trapezoidal waveform, as can be seen in FIG. 5.

In an embodiment, the determining of Block 310 may include the controller 124 receiving the commanded main current from another controller, a user interface or a machine system, or may include retrieving the commanded main current from a memory component 150. In yet another embodiment, the determining may include calculating, by the controller 124, the commanded main current based on operational parameters. Such operational parameters may include rotor speed, rotor position, DC link voltage of the electric drive system 102, torque command or combinations thereof. The controller 124 may also receive operational parameters including: a target, actual or estimated speed; a torque command for the rotor; and/or a target, estimated or actual DC link voltage associated with the electric drive system 102.

In block 320, the controller 124 determines a commanded parasitic current associated with energization by the parasitic current 140 (FIG. 4) of a second portion of the windings 130 in a non-controlling phase 134. The commanded parasitic current is associated with the generation of AC current to be provided by the inverter 122 to energize one or more windings 130 (in a non-controlling phase 134) of the stator 128 to provide an amount of current that may be utilized to determine the position of the rotor 126 in the stator 128, for example in stators 128 that do not have direct position sensing of the rotor 126 by a position sensor mounted on a shaft operably coupled to the rotor 126. Such current may be referred to as parasitic current 140.

While the parasitic current 140 may be injected for diagnostic purposes, injection of such parasitic current 140 may also result in the generation of a retarding torque (e.g., when the SR machine 104 is operating in a motoring quadrant) in the opposite rotational direction from the desired torque produced by the main current 138 in the controlling phase 132. When the rotor 126 is stationary, the parasitic current 140 may produce a retarding torque that may cause a rotational force on the rotor 126 in an unintended direction and may increases the torque required to start the rotor 126 rotating in the intended direction.

Typically, parasitic current 140 has a relatively low amplitude depending on the application (for example, more than 0 amps (A) up to 150 amps (A), 25-150 A, 45-53 A, or about 50 A) in order to provide enough current for determining the position of the rotor 126 while minimizing the production of retarding torque. The parasitic current 140 may include a plurality of current pulses ("parasitic pulses") 146 injected during a parasitic injection window 144. Each such parasitic pulse 146 has a pulse area 152 under the waveform curve, as is known in the art. In some embodiments, the parasitic pulse 146 may have a generally trapezoidal shaped waveform, as can be seen in FIG. 4. In other embodiments, the parasitic current 140 may have other waveforms.

In block 330, the controller 124 determines a target current 136 (see FIG. 5) to be supplied by the inverter 122 to energize the one or more controlling phase 132 windings 130 of the stator 128 during the parasitic injection window 144. The target current 136 is intended to compensate for the retarding effect (e.g., when operating in a motoring quadrant) of the parasitic current 140 on torque. As is known in the art, SR machines 104 may operate in retarding quadrants and in motoring quadrants. The parasitic pulses 146 are considered to be in a retarding quadrant when the SR machine 104 is motoring and in a motoring quadrant when the SR machine 104 is retarding. This applies when the SR machine 104 is acting as a motor or acting as a generator or in other applications of the SR machine 104. In an embodiment, when the speed of the rotor 126 is relatively low (e.g., in the range of about 0 to 500 rpm, the controller 124 may determine such a target current 136 to be supplied by the inverter 122 to energize the one or more controlling phases 132 of the stator 128 and compensate for the retarding effect of the parasitic current 140. The target current 136 may be based on, or be equivalent to, the sum of the commanded main current and an offset current 142.

As part of the determining of a target current 136, the controller 124 determines the offset current 142. The offset current 142 may be based on the commanded parasitic current (FIG. 4). In one embodiment, the offset current 142 may be set equivalent to an amplitude of the commanded parasitic current during the parasitic injection window 144. For example, in one embodiment, the offset current 142 may be set equal to a maximum or target amplitude of the parasitic current 140 (or a parasitic pulse 146) in the parasitic injection window 144. In an exemplary embodiment, the parasitic current 140 may be equal to 50 A and the offset current 142 may be set equal to 50 A. The commanded target current may then be equal to the sum of the commanded main current and the offset current 142 of 50 A (the value of the amplitude of the parasitic current 140). The value of 50 A is exemplary; other amplitudes associated with the parasitic current 140 may be utilized to tune the offset current 142 (for example, more than 0 amps (A) up to 150 amps (A), 25-150 A, 45-53 A, or about 50 A).

In some applications, adding a constant value offset current 142 to the main current 138 may result in either over compensation or under compensation because the sum of the pulse areas 152 of each of the parasitic pulses 146 in the parasitic injection window 144 may not actually equal the area 154 under the target current 136 curve. In some cases, the target current 136 required to compensate for the effect of the retarding torque is much higher than the target current 136 calculated by the controller 124 using a constant value of amplitude for the parasitic current 140 (e.g., 50 A). To help resolve this, the calculation of the offset current 142 may be refined. In the refinement, the controller 124 may determine/calculate an offset current 142 that is based on the sum of the commanded main current and an offset current 142, wherein the offset current 142 is based on the sum of the pulse area 152 under each parasitic pulse 146 in the parasitic injection window 144.

FIG. 5, illustrates, an exemplary scenario comparing a first target current 136a based on a commanded main current plus an offset current 142a equal to a parasitic current 140 (for example 50 A) versus a second target current 136b based on a commanded main current plus an offset current 142b, wherein the offset current 142b is based on the sum of the pulse area 152 under each parasitic pulse 146 in the parasitic injection window 144. In this exemplary scenario, the first target current 136a under compensates for the retarding torque of the parasitic current 140 and the second target current 136b fully compensates for such retarding torque. The controller 124 may utilize a look-up table, hash table, map or other structure (collectively, a "map") to determine the pulse areas 152 under each parasitic pulse 146 in the parasitic injection window 144. The pulse area 152 under each parasitic pulse 146 may be determined by retrieving from the map an area value based on the parasitic current 140 and a (estimated or actual) rotational speed of the rotor 126. In another embodiment, the pulse area 152 under each parasitic pulse 146 may be determined by retrieving from the map an area value based on the parasitic current 140, the (estimated or actual) rotational speed of the rotor 126 and the torque command for the rotor 126. In another embodiment, the pulse area 152 under each parasitic pulse 146 may be determined by retrieving from the map an area value based on the parasitic current 140, the (estimated or actual) rotational speed of the rotor 126 and the torque command for the rotor 126 and the (estimated or actual) DC link voltage associated with the electric drive system 102. The values in map for pulse area 152 may be the result of empirical evaluation, testing, known calculations, or via a combination of the above.

In block 340, the controller 124 actuates the target current 136 in the first portion of the windings 130 during the controlling phase 132. In some embodiments, the controller 124 also actuates the parasitic current 140.

In general, the foregoing disclosure finds utility in various applications relating to SR machines. More specifically, the disclosed electric drive system 102 and method may be used to compensate for the effect of parasitic current 140 (e.g., that utilized to determine the position and speed of a rotor 126) on the rotor 126, namely by compensating for retarding torque produced by the parasitic current 140.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A system for torque compensation in a switched reluctance (SR) machine disposed on a machine, the system comprising:
a switched reluctance (SR) machine including a stator and a rotor rotatably disposed within the stator, the stator including a plurality of windings, the SR machine configured to rotate the rotor when one or more of the windings are energized;
an inverter operably connected to the plurality of windings, the inverter configured to generate a target current in a first portion of the plurality of windings; and
a controller in operable communication with the inverter, the controller configured to:
determine a commanded main current associated with energization by a main current of the first portion of the plurality of windings for a controlling phase;
determine a commanded parasitic current associated with energization by a parasitic current of a second portion of the windings in a non-controlling phase;
determine an offset current based on the commanded parasitic current;
determine a target current based on a first sum of the commanded main current and the offset current; and
command the inverter to actuate the target current in the first portion of the windings during the controlling phase.

2. The system of claim 1, wherein the offset current is equivalent to an amplitude of the commanded parasitic current during a parasitic injection window.

3. The system of claim 2, wherein the amplitude is a maximum amplitude of the commanded parasitic current during the parasitic injection window.

4. The system of claim 1,
wherein the parasitic current is a plurality of parasitic pulses injected during a parasitic injection window, each parasitic pulse having a pulse area,
wherein the offset current is equivalent to a second sum of the pulse area under each parasitic pulse in the parasitic injection window.

5. The system of claim 1, wherein the determining of the offset current is based on the commanded parasitic current and a rotational speed of the rotor.

6. The system of claim 1, wherein the determining of the offset current is based on the commanded parasitic current, a rotational speed of the rotor and a torque command for the rotor.

7. The system of claim 1, wherein the determining of the offset current is based on the commanded parasitic current, a rotational speed of the rotor and a torque command for the rotor and a DC link voltage.

8. A method of torque compensation in a SR machine, the SR machine including a stator and a rotor rotatably disposed within the stator, the stator including a plurality of windings, the SR machine configured to rotate the rotor when one or more of the windings are energized, the method comprising:

determining, by a controller, a commanded main current associated with energization by a main current of a first portion of the plurality of windings for a controlling phase;
determining, by the controller, a commanded parasitic current associated with energization by a parasitic current of a second portion of the windings in a non-controlling phase;
determining an offset current based on the commanded parasitic current;
determining a target current based on a first sum of the commanded main current and the offset current; and
actuating the target current in the first portion of the windings during the controlling phase.

9. The method according to claim 8, wherein the offset current is equivalent to an amplitude of the commanded parasitic current during a parasitic injection window.

10. The method according to claim 9, wherein amplitude is a maximum amplitude of the commanded parasitic current during the parasitic injection window.

11. The method according to claim 8,
wherein the parasitic current is a plurality of parasitic pulses injected during a parasitic injection window, each parasitic pulse having a pulse area,
wherein the offset current is equivalent to a second sum of the pulse area under each parasitic pulse in the parasitic injection window.

12. The method according to claim 11, wherein the determining of the offset current is based on the commanded parasitic current and a rotational speed of the rotor.

13. The method according to claim 11, wherein the determining of the offset current is based on the commanded parasitic current, a rotational speed of the rotor and a torque command for the rotor.

14. The method according to claim 11, wherein the determining of the offset current is based on the commanded parasitic current, a rotational speed of the rotor and a torque command for the rotor and a DC link voltage.

15. A computer program product comprising a computer usable medium having a computer readable program code embodied therein, the computer readable program code adapted to be executed to implement a method for torque compensation in a switched reluctance (SR) machine that includes a stator and a rotor rotatably disposed within the stator, the stator including a plurality of windings, the SR machine configured to rotate the rotor when one or more of the windings are energized, the method comprising:
determining, by a controller, a commanded main current associated with energization by a main current of a first portion of the plurality of windings for a controlling phase;
determining, by the controller, a commanded parasitic current associated with energization by a parasitic current of a second portion of the windings in a non-controlling phase;
determining an offset current based on the commanded parasitic current;
determining a target current based on a first sum of the commanded main current and the offset current; and
actuating the target current in the first portion of the windings during the controlling phase.

16. The computer program product of claim 15, wherein the offset current is equivalent to an amplitude of the commanded parasitic current during a parasitic injection window.

17. The computer program product of claim 15, wherein the parasitic current is a plurality of parasitic pulses injected during a parasitic injection window, each parasitic pulse having a pulse area,
   wherein the offset current is equivalent to a second sum of the pulse area under each parasitic pulse in the parasitic injection window.

18. The computer program product of claim 15, wherein the determining of the offset current is based on the commanded parasitic current and a rotational speed of the rotor.

19. The computer program product of claim 15, wherein the determining of the offset current is based on the commanded parasitic current, a rotational speed of the rotor and a torque command for the rotor.

20. The computer program product of claim 15, wherein the determining of the offset current is based on the commanded parasitic current, a rotational speed of the rotor and a torque command for the rotor and a DC link voltage.

* * * * *